United States Patent [19]

Rearwin et al.

[11] 3,789,302

[45] Jan. 29, 1974

[54] FM HETERODYNE TRANSMITTER

[75] Inventors: Richard H. Rearwin, Concord; Fred P. Collins, Carlisle, both of Mass.

[73] Assignee: Microwave Associates, Inc., Burlington, Mass.

[22] Filed: Mar. 31, 1972

[21] Appl. No.: 240,217

[52] U.S. Cl. .................... 325/146, 325/153, 332/19
[51] Int. Cl. .................... H03c 3/08
[58] Field of Search ... 325/125, 126, 148, 159, 184, 325/7, 9, 11, 153; 331/18, 25; 332/16 R, 19; 330/124, 125, 126

[56] References Cited

UNITED STATES PATENTS

| | | | |
|---|---|---|---|
| 3,393,380 | 7/1968 | Webb | 332/19 |
| 3,531,722 | 9/1970 | Siebold | 325/184 X |
| 2,250,104 | 7/1941 | Morrison | 325/148 X |
| 3,502,987 | 3/1970 | Newton | 325/159 |
| 2,636,116 | 4/1953 | Taylor | 325/126 |

*Primary Examiner*—Benedict V. Safourek
*Attorney, Agent, or Firm*—Alfred H. Rosen; Frank A. Steinhilper

[57] ABSTRACT

An FM heterodyne transmitter is disclosed useful, for example, in a microwave relay link, using all solid-state components throughout. The transmitter includes an RF amplifier which generates locally a signal having the same frequency as the signal carrier and a phase comparator which accepts both the local and the received signals and provides an error signal responsive to a phase difference between them. The error signal is used in a feedback amplifier loop to correct the local oscillator frequency in the direction which tends to negate the error signal.

12 Claims, 5 Drawing Figures

FM HETERODYNE TRANSMITTER

BACKGROUND OF THE INVENTION

Frequency modulated high-frequency transmitters, exemplified in particular by microwave relay equipment, have heretofore employed vacuum tubes such as traveling wave tubes as final-stage or power amplifiers. This invention provides an all solid state FM heterodyne transmitter, as a replacement for such tubes.

GENERAL NATURE OF THE INVENTION

A typical frequency range of operation for microwave relay equipment is from 6 to 12 GHz. One of the problems to be solved in designing a solid state FM heterodyne transmitter at 6 GHz or 12 GHz is that of obtaining the desired output power, typically 3 watts at 6 GHz or 1 watt at 12 GHz. A general purpose of microwave repeaters is to repeat the frequency deviations appearing at the input of a receiver at the output of a transmitter at a higher level with the same or a different carrier frequency. The present invention meets these requirements using presently-available solid-state components. Prior microwave repeaters use down-conversion in the receiver to a 70 MHz I.F., and then up-conversion to a new carrier, followed by amplification in a traveling wave tube. In a microwave repeater according to the present invention, the method of "re-modulating" the incoming signal is not changed. The re-modulated signal, which exists at low-level (typically 1–2 milliwatts at 6 GHz or 12 GHz) is fed to a phase comparator as an incoming reference signal, where it is compared in phase with an internally-generated carrier signal. As the incoming signal is deviated, an instantaneous phase error signal is developed, and this signal is fed through an AC/DC error feedback amplifier to the internal carrier signal generator where the DC error component is used to move the internally generated carrier frequency in the direction which tends to negate the error signal. The AC component carries the frequency deviations to be repeated.

The internally generated carrier is obtained by frequency multiplication from a voltage-controlled oscillator dimensioned to oscillate at a frequency which is a fraction (e.g: one-quarter) of the carrier frequency. A cavity transistor local oscillator in the 2 GHz range is useful, and a varactor diode can be used to tune such an oscillator responsive to the DC error feedback component. Output power is derived by amplifying the local oscillator signal and then multiplying its frequency to the desired carrier frequency. The output carrier frequency can be different from the input carrier frequency, as well as identical to it, depending on the frequency multiplication that is chosen.

DETAILED DESCRIPTION OF THE DRAWINGS

Figure 1:
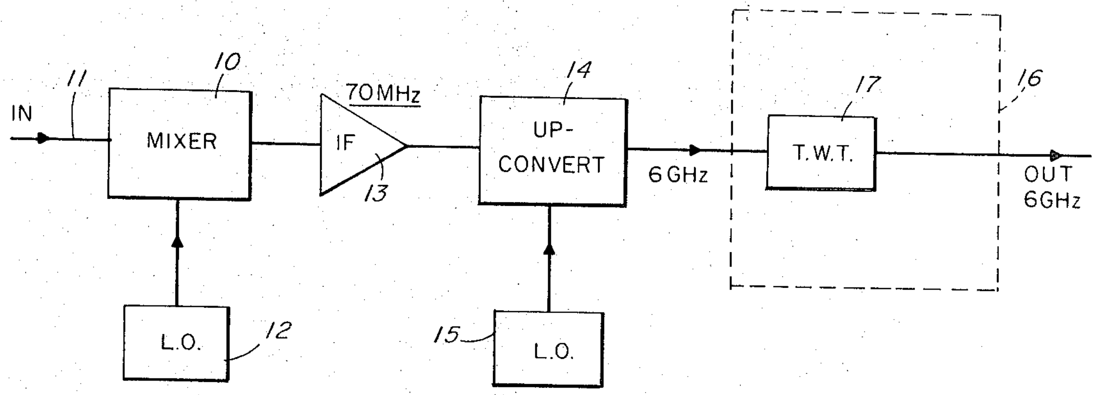
FIG. 1 (PRIOR ART)
FIG. 1 illustrates a prior-art microwave repeater.

The invention is illustrated in connection with an output carrier frequency chosen to be 6 GHz. In FIG. 1, the receiver-mixer 10 accepts an output signal at antenna 11 and cooperating with a first local oscillator 12 provides an intermediate frequency signal, typically 70 MHz. This signal is amplified in an I.F. amplifier 13 and the amplified signal is passed to an up-converter 14 which cooperating with a second local oscillator 15 provides a new carrier (at 6 GHz) for amplification in the transmitter section 16 containing a traveling wave tube 17. The present invention replaces the traveling wave tube and related components in the transmitter.

Figure 2:
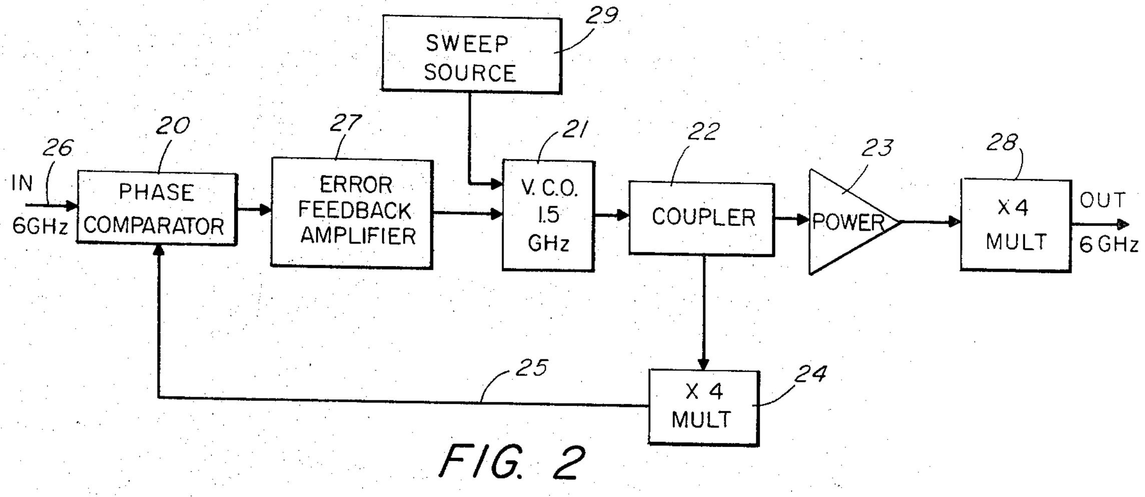
FIG. 2 is a block diagram of the invention.

As is shown in FIG. 2, the 6 GHz new carrier signal is fed to one input line 26 of a phase comparator 20. A voltage-controlled local oscillator 21 which runs at a nominal frequency of 1.5 GHz (one-quarter the carrier frequency) supplies its output through a directional coupler 22 to a power amplifier 23, and a sample of the output to a low-level frequency multiplier 24 which provides an output at four times the oscillator frequency (i.e.: 6 GHz) to the phase comparator over a second input line 25. The phase comparator, which may take any known form, such as a microwave balanced mixer (for example, Microwave Associates, Inc. Model MA-1105) is used to compare the incoming reference signal on line 26 with the internally generated 6 GHz signal on line 25, and to provide output voltage to an error feedback amplifier 27. This output includes a DC signal the magnitude of which is dependent on the phase difference between the two input signals, as will be described in greater detail with reference to FIG. 4. The DC output signal representing phase error is an analog voltage which typically may be varied between prescribed limits. It is applied to the voltage-controlled oscillator 21 so as to alter the frequency of its oscillation in the sense that tends to minimize the phase difference and hence the error signal. The loop locks in such a way that a frequency error in the voltage-controlled oscillator 21 appears as a phase error of such polarity that the oscillator frequency is driven to reduce the error to a very small magnitude. The error feedback amplifier provides also an AC signal which repeats the frequency-modulation (deviation) information carried on the originally-received carrier.

By this technique, the local oscillator 21 is phase-locked to the carrier frequency introduced at input 26 of the phase comparator 20, and a phaselock amplifier, or transmitter phase-locked loop, is provided. The phase-locked output of the local oscillator 21 is fed to the power amplifier 23, at the low frequency of the oscillator, and the higher-powered signal from the amplifier is then frequency multiplied in a high level multiplier 28, which provides the transmitter output signal. If the multiplication factor is four (4), this will be a signal at a carrier frequency of 6 GHz. This type of chain is commonly used in remodulating transmitters with the modulating waveform being applied to the frequency control terminal of a voltage-controlled oscillator. The phase-lock features of the invention assure that the frequency deviation at the 6 GHz input is precisely reproduced at the output. The frequency deviations of the local oscillator 21 are frequency-multiplied in the low-level multiplier 24 to produce an accurate replica of the high level output. This low level 6 GHz signal is compared in phase with the input 6 GHz signal to determine if a frequency error exists in the output.

By using feedback of this type, the result is a zero steady state frequency error between the input frequency and the output frequency. If a steady state frequency error did exist, the DC output of the phase comparator would increase linearly with time and would rapidly drive the voltage-controlled oscillator 21 back to the correct frequency. In effect, an integration has been inserted into the loop.

The phase feedback has the following desirable characteristics:

1. FM Noise — Any FM noise appearing at the output of the voltage controlled oscillator that is not at the input is degenerated by the open-loop gain of the feedback loop. This results in very low FM noise at the output of the chain with a clean input.

2. Distortion — In the conversion of baseband to FM deviation in the voltage controlled oscillator, there is a small amount of distortion created due to nonlinearities in the voltage controlled oscillator control. Since the voltage controlled oscillator is inside the feedback loop, this distortion is degenerated by the open loop gain of the feedback loop. This results in very low differential gain through the loop.

To provide for automatic lock-on of the loop, sweep circuitry 29 is included in the design. A ramp waveform is generated and applied to the voltage controlled oscillator to sweep the output frequency through several hundred megacycles at the output. When the output frequency comes near the input frequency, the feedback loop locks and produces a drive to the voltage controlled oscillator to counteract the sweep waveform. Once the loop has locked, the large voltage excursions at the phase comparator output disappear. This disappearance is sensed and used to discount the sweep waveform from the voltage controlled oscillator, once lock has been achieved.

Figure 3:
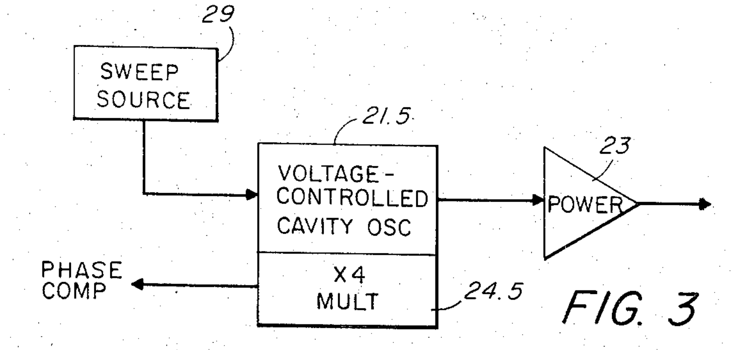
FIG. 3 shows a variation of FIG. 2.
Figure 5:
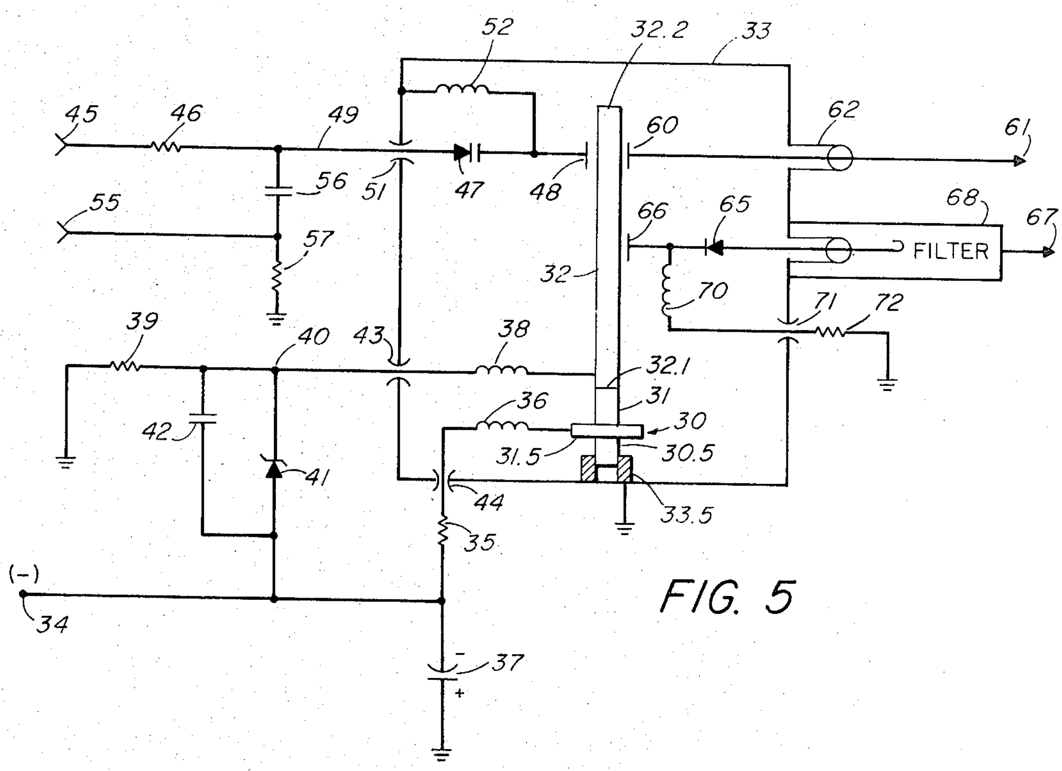
FIG. 5 is a schematic illustration of the local oscillator-frequency multiplier configuration shown in FIG. 3.

FIG. 3 illustrates a modification of the system shown in FIG. 2, in that the voltage-controlled oscillator 21.5 and the X4 low-level multiplier are combined, and the directional coupler 22 is omitted from the system. A schematic diagram of a physical realization of this oscillator-multiplier combination is shown in FIG. 5, where the oscillator comprises a transistor 30 in a grounded collector, base tuned configuration with outputs taken from the base 31. The base is connected directly to the inner electrical conductor 32 of a coaxial cavity 33 having electrically conductive walls and dimensioned for resonance at about 1.5 GHz. The collector 30.5 is held in a socket 33.5 in the cavity and is thereby grounded to the cavity wall. Supply voltage for the oscillator is applied to the emitter 31.5 via a supply terminal 34 through a resistor 35 and an RF choke 36, and a capacitor 37 is connected from this terminal to ground. A second RF choke 38 and a resistor 39 having a common junction 40 are connected in series from the base 31 to ground, a zener diode 41 and capacitor 42 being connected in shunt from the junction 40 to the supply terminal 34. DC circuits for the chokes 36 and 38 are completed via feed through capacitors 43 and 44.

The DC error voltage from the error feedback amplifier 27 is applied to the error input terminal 45, which is connected via a resistor 46 to the anode side of a tuning diode 47 which in the present example is a varactor. This diode is within the cavity 33, and its cathode side is coupled capacitively to the center conductor 32 via a probe 48 located adjacent the center conductor. The connecting line 49 from the error input terminal to the tuning diode enters the cavity via a feed-through capacitor 51. An RF choke 52 is connected between the tuning probe 48 and the inner wall of the cavity 33.

Modulating AC signals are coupled into the cavity via a modulation input terminal 55 that is connected to the junction of a capacitor 56 and a resistor 57 which are connected in series from the junction of the tuning circuit resistor 46 and the tuning diode 47 to ground.

Oscillator output energy is taken from the cavity 33 via an output probe 60 adjacent the center conductor 32 to an external output terminal 61 through a coaxial output line 62. The frequency multiplier comprises a resistive diode 65 having its cathode side coupled to the center electrode 33 via a multiplier probe 66 and its anode connected to an external multiplier output terminal 67 through a filter 68. An RF choke 70 is connected at one side to the multiplier probe 66 and at the other side passing through a feed-through capacitor 71 to a resistor 72 which is connected to ground.

Exemplary components in FIG. 5 are dimensioned or identified, respectively, as follows:

transistor 30—RCA type TA 7679
diode 47—MA type 45514 varactor
diode 65—1N23F
diode 41—1N5228B
capacitor 42—electrolytic, 6.8 mfd at 35 volts
capacitor 37—electrolytic, 6.8 mfd at 35 volts
capacitor 43—200 pf
capacitor 44—200 pf
capacitor 56—0.1 mfd
capacitor 51—47 pf
capacitor 71—0.001 $\mu$fd
resistor 35—22 ohms, 1 watt
resistor 39—1.5 kilohms, ½ watt
resistor 46—2 kilohms, ½ watt
resistor 57—75 ohms
resistor 72—32 ohms Voltage supplied at terminal 34 is (−) 24 volts at 180 milliamperes. The DC tuning voltage applied at the error voltage (tuning) terminal 45 ranges between about (−) 5 and (−) 15 volts, DC. Superimposed on this DC voltage (at whatever level) is the modulating AC signal from the modulation terminal 55, thereby generating direct frequency modulation. The network comprising resistor 46 and capacitor 56 between the input terminsl 45 and 55 is intended to by-pass through the capacitor any oscillating voltage component appearing at the DC terminal 45 which has a frequency greater than about 800 cycles per second. On the other hand, modulating signals applied at the AC terminal 55 will be coupled by the capacitor to the diode 47. The resistor 57 from the AC terminal to ground is a terminating impedance for the AC signal cable, which in usual practice has a characteristic impedance of 75 ohms. The oscillator is thus maintained on frequency and FM modulated by two separate inputs from the error feedback amplifier 27, derived as will be described below in connection with FIG. 4.

The varactor diode 47 is a voltage-variable capacitor. It is well-known that the resonance frequency of a cavity such as the cavity 33 can be adjusted by altering capacitance between its inner and outer conductors. The transistor 30 is chosen for its physical configuration and for its low base impedance. Thus, the lower end 32.1 of the center conductor is at a lower impedance level than the upper end 32.2, and the voltage standing wave pattern established in the cavity during oscillation exhibits a high voltage antinode near the upper end 32.2. The tuning probe 48 is located adjacent the high-voltage antinode of the voltage standing wave pattern existing in the cavity during oscillation, so that the effect of varying this capacitance will be correspondingly large. Moreover, since a cavity resonator is a high Q device, the frequency shift due to changing capacitance of the diode 47 will be sharp, and therefore precise. The frequency multiplier diode 65 is coupled to the center conductor 32 at a lower-voltage region in the voltage standing wave pattern, so as to extract only a small sample of the oscillator-frequency energy in the cavity, this being intended for use in a low-level multiplier. The output coupling probe 60 is near the higher-voltage end 32.2, so that a major portion of the generated oscillator-frequency energy is left to be supplied at the oscillator output terminal 61. The filter 68 is dimensioned for resonance to the fourth harmonic of the cavity resonance frequency, which in this instance is 6 GHz.

The voltage controlled oscillator can be a varactor-controlled transistor oscillator as shown. It can also take other forms, for example, a varactor-controlled Gunn oscillator, or an IMPATT-diode oscillator. It could in principle be a klystron, but preferably it is an all solid-state oscillator.

The low-level frequency multiplier need not be incorporated in the oscillator cavity. A sample of the oscillator-frequency output energy can be taken through a directional coupler 22 as is shown in FIG. 2, and from there supplied to a separate low-level frequency multiplier 24. It will therefore be understood that the voltage-tunable cavity oscillator shown in FIG. 5 can be used as the voltage controlled oscillator 21 in FIG. 2 as well as in FIG. 3. When used in the FIG. 3 configuration, the diode 65 may be located within the cavity 33 or outside. In a practical configuration, the filter 68 has been made in the form of a section of waveguide affixed to the wall of the cavity and a common aperture has been provided for communication between the interior of the cavity and the interior of the waveguide, the diode 65 then being located in the aperture so that it was partly in one and partly in the other. The essential function, namely to extract directly from the cavity a sample of its oscillation energy at low level, generate harmonics of that energy, and filter out for use a desired harmonic, in this instance the fourth harmonic, can be achieved in many ways. A preferred way, however, will be one which provides a time delay through the oscillator and the multiplier which does not exceed about 2 nanoseconds.

Figure 4:
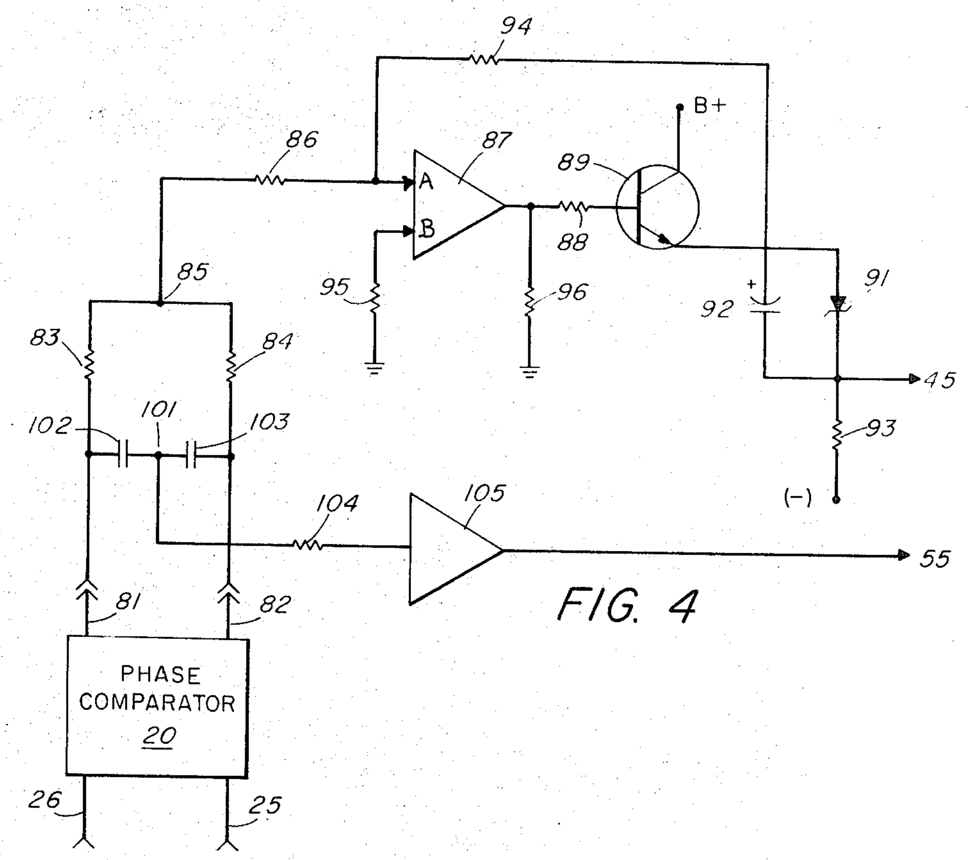
FIG. 4 is a schematic illustration of the error feedback amplifier shown in FIG. 2.

The error feedback amplifier circuit illustrated in FIG. 4 accepts two signals which are available at outputs 81 and 82 from the phase comparator. In the exemplary microwave balanced mixer mentioned above, these will be the crystal outputs from the mixer. They are fed to a combining network comprising two equal resistors 83 and 84 in series across the outputs 81 and 82, the junction 85 of these resistors being connected via a resistor 86 to one of two inputs 87A of a DC error voltage amplifier 87, which may be one of a variety of operational amplifiers available on the open market. In this instance, one identified as Fairchild μA709C has been used. A second input 87B of this amplifier is connected via a resistor 95 to ground. The desired characteristics of this amplifier are that it pass DC and only low frequency signals. The output of this amplifier is fed over a resistor 88 to the base of a transistor 89, the collector of which is connected to a source of positive voltage and the emitter of which is connected to the negative side of the voltage source via the parallel combination of a zener diode 91 and a capacitor 92 in series with a resistor 93. The DC control voltage applied to the tuning terminal 45 of the voltage controlled oscillator is generated in this resistor 93.

A negative feedback path for linearizing the amplifier 87 is provided from transistor 89 emitter to amplifier 87 input 87A via a resistor 94.

The AC or modulating signal is taken from the combining network at the junction 101 of two capacitors 102 and 103 which are connected in parallel with the resistors 83 and 84 across the phase-comparator output terminals. From this junction the modulating signal is fed over a resistor 104 to an amplifier 105, the output of which is applied directly to the AC input of the voltage-controlled oscillator. The amplifier is shown symbolically, since it can take many forms. One may use, for example, a cascode amplifier stage followed by an emitter follower, with negative feedback from output to input. Desired characteristics are that this amplifier exhibit low time delay, on the order of two (2) nanoseconds, in the pass-band from about 10 KHz to about 200 MHz.

Components illustrated in FIG. 4 may be identified or specified as follows:

resistors 83 and 84—each 100 ohms
capacitors 102 and 103—each 1.5 μfd
resistor 86—1000 ohms
resistor 95—1000 ohms
resistor 94—56 kilohms
resistor 88—1,800 ohms
resistor 96—1000 ohms
resistor 93—1000 ohms
resistor 104—75 ohms
capacitor 92—6.8 μfd at 35 volts
diode 91—1N758
transistor 89—2N3904

It will be appreciated that the circuit of FIG. 4 is schematic only, and that details of power supply have been included only for transistor 89 since the current flow through that transistor generates the DC voltage which tunes the voltage controlled oscillator. A voltage difference of 36 volts, made up of (+) 12V at the collector and (−) 24 volts at resistor 93 is appropriate. If the signals at phase comparator inputs 25 and 26 (being of the same frequency) are in phase then no current flows in the resistors 83 and 84 from one output terminal 81 or 82, to the other. The modulating AC signal appears at both outputs, however, whether in phase or not. The limits of current through transistor 89 are such that the voltage appearing at the junction of resistor 93 and zener diode 91 (i.e: at the DC terminal 45) will range between specified limits, in the present instance, between (−) 5 and (−) 15 volts, DC. The zener diode provides an off-set for proper operation of the transistor. A change in the input voltage applied to the DC amplifier 87 will alter the current through the transistor, as follows.

The DC amplifier 87 compares the voltage present at the first input 87A to ground, at the second input 87B. The voltage gain of this amplifier in the present example is (−) 56, the ratio of resistor 94 (56K) to resistor 86 (1K), the negative sign being due to inverted polarity between input and output. Thus, at the emitter of the transistor 89 there is an amplified (56X) phase inverted replica of the input from the phase comparator 20. This replica voltage is DC level shifted by the zener diode 91 down to a nominal level of (−) 10 volts. If the input to the DC amplifier at the first terminal 87A is exactly zero volts, then the output of the error feedback amplifier at the DC output terminal 45 is (−) 10 volts. If the input to the DC amplifier at the first terminal 87A goes in the positive direction from zero volts, for example, to (+) 0.1 volt, then the output voltage after the zener diode, that is at the DC output terminal, will change by (−) 0.1 × 56, or (−) 5.6 volts, to (−) 15.6 volts. Vice versa, if the input voltage shifts by (−) 0.1 volt from zero, then the output voltage at the DC output terminal changes by (−) (−) 0.1 × 56 = (+) 5.6 volts, to (−) 4.4 volts.

In the phase comparator, the output diodes at terminals 81 and 82 provide output voltages which are (for example) normally at (−) 2 volts and (+) 2 volts, respectively, when the inputs are exactly in phase. The output voltage at the DC output terminal 85 is then zero. If there is a phase imbalance at the inputs 25 and 26, one diode will be "on" longer than the other, and the average value over several cycles of the inputs at terminals 25 and 26 of the voltage at the DC output terminal will shift away from zero in a direction determined by the sense or direction of the phase imbalance. This shift, on the order of a fraction of a volt appears at the DC output terminal 45 of the DC error amplifier, where it is applied to the varactor diode 47 to shift the voltage-controlled oscillator frequency in the direction which tends to reduce the phase imbalance at the inputs 25 and 26 to the phase comparator 20.

We claim:

1. In an FM heterodyne transmitter, RF amplifier means comprising input means (to provide an) for a modulated RF signal at a specified carrier frequency, voltage-controlled local oscillator means to provide a signal at a frequency which is a specified fraction of said carrier frequency, first frequency-multiplier means arranged to accept a sample of said local oscillator signal and to provide in response thereto a first output signal having the same frequency as said carrier frequency, phase-comparator means arranged to accept said RF signal and said first output signal and to provide (an) a DC error signal responsive in magnitude to a phase difference between them and an AC signal which substantially repeats the modulation information of said RF signal, error signal feedback-amplifier means arranged to receive said error signal and to provide in response thereto a controlling voltage to said local oscillator whereby to cause said local oscillator to oscillate at a frequency tending to negate said error signal, local oscillator signal amplifier means coupled to said local oscillator to receive local oscillator output signal and amplify same, and second frequency-multiplier means arranged to receive amplified local oscillator signal from said amplifier and to provide in response thereto a second output signal having an output carrier frequency which may be the same frequency as said input carrier frequency, and substantially repeating the frequency deviations of said input modulated RF signal.

2. Amplifier means according to claim 1 in which said error feedback means comprises two branches, a first branch having low-pass filter properties for providing essentially a DC voltage to tune said local oscillator means, a second branch having high-pass filter properties for providing an AC voltage having modulation information to said local oscillator, time delay of modulation information through said second branch being on the order of two nanoseconds.

3. Amplifier means according to claim 1 in which said local oscillator comprises a cavity resonator and a voltage-variable capacitance semiconductor device for adjusting the resonance frequency responsive to a DC voltage applied to said semiconductor device, and said error signal comprises a DC voltage, and means coupling said DC voltage to said semiconductor device.

4. Amplifier means according to claim 1 in which said local oscillator includes sampling means for providing a low level signal to said first frequency multiplier means.

5. Amplifier means according to claim 3 in which said resonator is a coaxial resonator having an inner conductor along which a voltage standing wave pattern is developed during oscillation, and including a first output coupling member located relative to said conductor for extracting a signal at a first level near the anti-node peak of said pattern for amplification and output, and a second output coupling member located relative to said conductor for extracting said sample at a second lower level which is a small fraction of said first level.

6. Amplifier means according to claim 5 including a resistive diode connected at one side to said second output coupling member and at the other side to a filter dimensioned to pass a harmonic of the resonance frequency of said cavity.

7. Amplifier means according to claim 6 in which said filter is a waveguide section attached to said resonator, and coupled thereto via a common aperture.

8. Amplifier means according to claim 1 in which a directional coupler is disposed between said local oscillator and said local oscillator signal amplifier means, for providing a sample of said local oscillator signal to said first frequency multiplier means.

9. Amplifier means according to claim 1 in which said first frequency multiplier means exhibits time delay on the order of two nanoseconds.

10. Amplifier means according to claim 2 in which said first frequency multiplier means exhibits time delay not greater than about two nanoseconds.

11. Amplifier means according to claim 2 in which said first branch includes phase comparator means providing an output voltage which is zero when the phase difference between said RF signal and said first output signal is zero and which in the presence of a phase difference shifts an amount proportional to the difference but not greater than a fraction of a volt away from zero in a sense dependent on the direction of said difference, and an essentially DC amplifier having input means to compare said phase comparator output voltage with a reference for amplifying said amount while retaining the sense information.

12. Amplifier means according to claim 11 in which said DC amplifier has an output circuit that provides a nominal error-signal output voltage having an established magnitude representing the case of zero phase difference, and said amplified amount is added to said nominal voltage, the magnitude of said amplified amount being smaller in all cases then said established magnitude.

* * * * *

PO-1050
(5/69)

UNITED STATES PATENT OFFICE
CERTIFICATE OF CORRECTION

Patent No. 3,789,302 Dated January 29, 1974

Inventor(s) Richard H. Rearwin and Fred P. Collins

It is certified that error appears in the above-identified patent and that said Letters Patent are hereby corrected as shown below:

Column 2, line 2, change "output" to --input--

Column 4, line 45, change "terminsl" to --terminals--

Signed and sealed this 3rd day of June 1975.

(SEAL)
Attest:

RUTH C. MASON
Attesting Officer

C. MARSHALL DANN
Commissioner of Patents
and Trademarks